United States Patent
Kryuchkova et al.

(10) Patent No.: US 12,469,291 B2
(45) Date of Patent: Nov. 11, 2025

(54) NEURAL-NETWORK-BASED PREDICTION OF THE STOPPING MOMENT FOR TEXT RECOGNITION IN A VIDEO STREAM

(71) Applicant: Smart Engines Service, LLC, Moscow (RU)

(72) Inventors: Kseniya Stanislavovna Kryuchkova, Moscow (RU); Aleksandr Vladimirovich Sheshkus, Belgorodskaya oblast (RU); Konstantin Bulatovich Bulatov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 476 days.

(21) Appl. No.: 18/101,894

(22) Filed: Jan. 26, 2023

(65) Prior Publication Data
US 2023/0419667 A1 Dec. 28, 2023

(30) Foreign Application Priority Data
Jun. 14, 2022 (RU) .......................... RU2022115947

(51) Int. Cl.
*G06V 20/40* (2022.01)
*G06V 10/764* (2022.01)
(Continued)

(52) U.S. Cl.
CPC ............ *G06V 20/49* (2022.01); *G06V 10/764* (2022.01); *G06V 10/7715* (2022.01);
(Continued)

(58) Field of Classification Search
CPC .... G06V 20/49; G06V 10/7715; G06V 20/63; G06V 10/82; G06V 10/94; G06V 10/774;
(Continued)

(56) References Cited

U.S. PATENT DOCUMENTS 11,816,910 B2 * 11/2023 Bulatov .................. G06V 20/62
2012/0203720 A1 * 8/2012 Baker .................... G06F 18/214
706/12

(Continued)

OTHER PUBLICATIONS

Vladimir V. Arlazarov [ . . . ], "Method of determining the necessary number of observations for video stream documents recognition," Proc. SPIE 10696, Tenth International Conference on Machine Vision (ICMV 2017), 106961X (Apr. 13, 2018); https://doi.org/10.1117/12.2310132 (Year: 2018).*

(Continued)

*Primary Examiner* — Utpal D Shah
*Assistant Examiner* — Jack Peter Kraynak
(74) *Attorney, Agent, or Firm* — Osha Bergman Watanabe & Burton LLP (57) ABSTRACT

When performing text recognition on a video stream, it is beneficial to stop the recognition process as soon as an acceptable recognition result is obtained. In an embodiment, a method for determining when to stop the recognition process method for a text field utilizes a predictive model, such as a neural network, to classify a sequence of calculated errors between text-recognition results for a set of successive frames in the video stream. The classification is used to determine whether to stop the recognition process at the current frame, or to continue the recognition process on the next frame.

20 Claims, 4 Drawing Sheets

(51) Int. Cl.

| | |
|---|---|
| *G06V 10/77* | (2022.01) |
| *G06V 10/774* | (2022.01) |
| *G06V 10/776* | (2022.01) |
| *G06V 10/82* | (2022.01) |
| *G06V 10/94* | (2022.01) |
| *G06V 20/62* | (2022.01) |

(52) U.S. Cl.
CPC .......... *G06V 10/774* (2022.01); *G06V 10/776* (2022.01); *G06V 10/82* (2022.01); *G06V 10/94* (2022.01); *G06V 20/63* (2022.01)

(58) Field of Classification Search
CPC .... G06V 10/776; G06V 10/764; G06V 20/48; G06V 20/40; G06V 20/62; G06V 10/765
See application file for complete search history.

(56) References Cited

U.S. PATENT DOCUMENTS

| | | | |
|---|---|---|---|
| 2020/0193204 A1* | 6/2020 | Hakim | G06V 20/582 |
| 2023/0394226 A1* | 12/2023 | Medalion | G06F 40/166 |

OTHER PUBLICATIONS

Bulatov, K., Razumnyi, N. & Arlazarov, V.V. On optimal stopping strategies for text recognition in a video stream as an application of a monotone sequential decision model. IJDAR 22, 303-314 (2019). (Year: 2019).*
K. Bulatov, N. Fedotova and V. V. Arlazarov, "Fast Approximate Modelling of the Next Combination Result for Stopping the Text Recognition in a Video," 2020 25th International Conference on Pattern Recognition (ICPR), Milan, Italy, 2021, pp. 239-246, doi: 10.1109/ICPR48806.2021.9412574. (Year: 2021).*
K. Bulatov, V. V. Arlazarov, T. Chernov, O. Slavin and D. Nikolaev, "Smart IDReader: Document Recognition in Video Stream," 2017 14th IAPR International Conference on Document Analysis and Recognition (ICDAR), Kyoto, Japan, 2017, pp. 39-44, doi: 10.1109/ICDAR.2017.347 (Year: 2017).*
Dangiwa et al., "A Business Card Reader Application for iOS devices based on Tesseract," 2018 International Conference on Signal Processing and Information Security (ICSPIS), 2018 IEEE, 4 pages.
Islam et al., "A Survey on Optical Character Recognition System," Journal of Information & Communication Technology—JICT vol. 10 Issue. 2, Dec. 2016, pp. 1-4.
Gai et al., "A Survey on FinTech," Journal of Network and Computer Applications, Oct. 13, 2017, 60 pages.
Gai et al., "A Survey on FinTech," Journal of Network and Computer Applications, Oct. 9, 2017, 103 (2018) 262-273.
Bulatov et al., "Smart IDReader: Document Recognition in Video Stream," 2017 14th IAPR International Conference on Document Analysis and Recognition, 2017 IEEE, pp. 39-44.
Ngoc et al., "Document detection in videos captured by smartphones using a saliency-based method," 2019 International Conference on Document Analysis and Recognition Workshops (ICDARW), 2019 IEEE, pp. 19-24.
Chernov et al., "Image quality assessment for video stream recognition systems," 10th Int'l Conference on Machine Vision (ICMV 2017), Int'l Society for Optics and Photonics (SPIE), 2018, pp. 71-82.
Federal Law No. 152-FZ of Jul. 27, 2006 on Personal Data, Passed by the State Duma on Jul. 8, 2006 Approved by the Federation Council on Jul. 14, 2006, 28 pages.
Regulation (EU) 2016/679 of the European Parliament and of the Council of Apr. 27, 2016 on the protection of natural persons with regard to processing of personal data and on the free movement of such data, and repealing directive 95/46/EC (General Data Protection Regulation), Official Journal of the European Union 2016, No. L119, pp. 1-88, 2016.

2002 Public Register of Authentic Identity and Travel Documents Online, www.consilium.europa.eu/prado/en/prado-start-page.html; 7 pages.
Tropin et al., "Approach for Document Detection by Contours and Contrasts," 2020 25th International Conference on Pattern Recognition (ICPR), Milan, Italy, Jan. 10-15, 2021, pp. 9689-9695.
Chernyshova et al., "Localization of Characters Horizontal Bounds in Text Line Images with Fully Convolutional Network," Proceedings of the SPIE, vol. 11433, id. 114333F 8 pp. (2020), 8 pages.
Chernyshova et al., "Two-Step CNN Framework for Text Line Recognition in Camera-Captured Images," IEEE Access, vol. 8, 2020, pp. 32587-32600.
Ryan et al., "An Examination of Character Recognition on ID card using Template Matching Approach," International Conference on Computer Science and Computational Intelligence (ICCSCI 2015), Procedia Computer Science 59 ( 2015 ) pp. 520-529.
K.B. Bulatov, "A Method to Reduce Errors of String Recognition Based on Combination of Several Recognition Results With Per-Character Alternatives," Bulletin of the South Ural StateUniversity. Ser. Mathematical Modelling, Programming & ComputerSoftware (Bulletin SUSU MMCS), 2019, vol. 12, No. 3, pp. 74-88.
K.B. Bulatov, "Selecting optimal strategy for combining per-frame character recognition results in video stream," Informatsionnye Tekhnologii i Vychslitel'nye Sistemy, 2017, Issue 3, pp. 45-55.
Chow et al., "Great expectations: The theory of optimal stopping," Houghton Mifflin, 2971. Book is Not Being Submitted.
Stone, M., & Ferguson, T. S. (1968). "Mathematical Statistics A Decision Theoretic Approach," Journal of the Royal Statistical Society. Series A (General), 131(2). p. 232.
Ferguson et al., "Stopping rules for proofreading," Journal of Applied Probability, vol. 26, No. 2, pp. 304-313, 1989, doi:10.2307/3214037.
Bulatov et al., "On optimal stopping strategies for text recognition in a video stream as an application of a monotone sequential decision model," IJDAR, vol. 22, No. 3, 2019, doi:10.1007/s10032-019-00333-0, 12 pages.
Liu et al., "Editorial for special issue on advanced topics in document analysis and recognition," International Journal on Document Analysis and Recognition (IJDAR), vol. 22, 2019, doi:10.1007/s10032-019-00342-z, 3 pages.
Arlazarov et al., "Method of determining the necessary number of observations for video stream documents recognition," Proc. of SPIE vol. 10696, (2018) 6 pages.
Yujian et al., "A Normalized Levenshtein Distance Metric," IEEE Transactions on Pattern Analysis and Machine Intelligence, vol. 29, No. 6, Jun. 2007, pp. 1091-1095.
Fiscus, A Post-Processing System to Yield Reduced Word Error Rates: Recognizer Output Voting Error Reduction (ROVER), 1997 IEEE, pp. 347-354.
Bulatov et al., "Fast Approximate Modelling of the Next Combination Result for Stopping the Text Recognition in a Video," 2020 25th International Conference on Pattern Recognition (ICPR) Milan, Italy, Jan. 10-15, 2021, IEEE (2020) pp. 239-246.
Arlazarov et al., "MIDV-500: a dataset for identity document analysis and recognition on mobile devices in video stream," Computer Optics 2019, 43(5), pp. 818-824.
Bulatov et al., "MIDV-2019: Challenges of the modern mobile-based document OCR," arXiv:1910.04009v1 [cs.CV] Oct. 9, 2019, 6 pages.
Bulatov et al., "MIDV-2020: a comprehensive benchmark dataset for identity document analysis," Computer Optics, 2022, vol. 46(2), pp. 252-270.
Reddy et al., "RoadText-1K: Text Detection & Recognition Dataset for Driving Videos," arXiv:2005.09496v1 [cs.CV] May 19, 2020, 7 pages.
Baek et al., "What Is Wrong With Scene Text Recognition Model Comparisons? Dataset and Model Analysis," 2019 EEE, pp. 4714-4722.
Zilberstein, "Using Anytime Algorithms in Intelligent Systems," American Association for Artificial Intelligence, 1996, pp. 73-83.

* cited by examiner

NEURAL-NETWORK-BASED PREDICTION OF THE STOPPING MOMENT FOR TEXT RECOGNITION IN A VIDEO STREAM

CROSS-REFERENCE TO RELATED APPLICATIONS

This application claims priority to Russian Patent App. No. 2022115947, filed on Jun. 14, 2022, which is hereby incorporated herein by reference as if set forth in full.

BACKGROUND

Field of the Invention

The embodiments described herein are generally directed to text recognition in a video stream, and, more particularly, to using a predictive model, such as a neural network or other classifier, to determine when to stop text recognition in a video stream.

Description of the Related Art

The number of public and private organizations that use automated systems for document recognition is increasing at a substantial rate. These systems are in wide use in the banking sector (Ref1, Ref2), in the sharing economy (Ref3), in the field of mobile services (Ref4), for reading documents at travel hubs (e.g., train stations, airports, etc.), for filling in personal data when purchasing tickets and registering personal accounts, and the like. An important subtype of documents that are the target of automated recognition and verification systems is identity documents, such as passports and drivers licenses (Ref5).

One of the most significant issues that arises, during the process of recognition in a video stream, is an inability to control the quality of the video capture, including lighting conditions, camera focus, and incident highlights (Ref6, Ref7). These factors complicate the recognition process and can negatively impact the recognition result. However, the accuracy of recognition is particularly important when processing identity documents.

Another problem in the field of recognition in identity documents is the lack of open datasets for benchmarking and experimental evaluation. In particular, the publication of this type of personal information is restricted (Ref8, Ref9). Therefore, researchers and developers are forced to prepare and use synthetically generated data, which do not always reflect reality, and perform evaluations using their own documents or a small set of publicly available samples. While there are several open-source identity databases, such as the Public Register of Authentic Travel and Identity Documents Online (PRADO) (Ref10), the images in these databases are generally not representative.

A typical recognition process comprises several steps, including object detection (Ref11), segmentation (Ref12), text recognition (Ref13), and more. For example, object detection may detect elements of an identity document, such as text fields, photographs, signatures, and/or the like, and segmentation may segment the detected text fields into characters or words. Text recognition is then used to recognize those characters or words, and output a set of relevant data extracted from the identity document. In the case of a passport, the relevant data may comprise the document type (e.g., indicating that the document is a passport), the passport number as read from the machine-readable zone, optional data from the machine-readable zone, the passport number as read from the passport-number field, the name of the passport holder, the nation that issued the passport (e.g., in both the native language and an operator language, such as English), and/or the like.

The advantage of performing recognition on a video stream is that the recognition system has the ability to process a sequence of frames in the video stream, to thereby extract more information than could be obtained from a single image. The image-processing and recognition algorithms can accumulate the per-frame results for each frame in the video stream, to increase the accuracy of the final recognition result (Ref14, Ref15, Ref16). However, the video stream is not naturally limited in time, which leads to the problem of how to find the optimal moment to stop the recognition process.

The problem of optimal stopping has been explored in the field of mathematical statistics (Ref17, Ref18, Ref19, Ref20). However, it has not been suitably studied in the domain of optical recognition in video streams (Ref21). Nevertheless, some classical stopping algorithms could be applied to the problem of recognizing text fields in a video stream.

In Ref22, the problem of stopping a video stream is assumed to be a monotone problem. Based on this assumption, a strategy was proposed, based on thresholding the estimates of the expected distance between the current recognition result and the next combined recognition result. Experimental studies have demonstrated the effectiveness of this strategy, relative to a trivial stopping rule that simply stops the recognition process after a fixed number of processed frames. This strategy can be used with clustering of a sequence of intermediate recognition results, as proposed in Ref23.

However, it is desirable to provide alternative strategies to determining the optimal stopping point during text recognition in a video stream. For example, it would be advantageous to have a stopping method that does not rely on the assumption that the problem is monotone.

SUMMARY

Accordingly, systems, methods, and non-transitory computer-readable media are disclosed for predicting the stopping moment for text recognition in a video stream, using a predictive model, such as a neural network or other classifier.

In an embodiment, a method comprises using at least one hardware processor to, for each of one or more fields in a plurality of frames from a video stream for which a recognition process is being performed: perform text recognition on the field to produce a current text-recognition result; combine the current text-recognition result with a preceding text-recognition result for the field from one or more prior frames; calculate an error between the combined text-recognition result and the preceding text-recognition result; add the calculated error to an accumulated feature set; and, when the accumulated feature set has reached a predefined size, wherein the predefined size is greater than one, apply a predictive model to the accumulated feature set of the predefined size to classify the accumulated feature set into one of a plurality of classes, wherein the plurality of classes comprises a first class that indicates continuation of the recognition process, and a second class that indicates stopping of the recognition process, when the one class is the first class, continue the recognition process for the field, and, when the one class is the second class, stop the recognition process for the field.

The error may be calculated based on a Levenshtein distance between the combined text-recognition result and the preceding text-recognition result. The error may be a normalized Levenshtein distance.

The plurality of classes may consist of the first class and the second class.

The predictive model may comprise a neural network.

The neural network may comprise a multilayer perceptron.

The accumulated feature set of the predefined size may consist of a plurality of most recently accumulated features within a sliding window having the predefined size.

The video stream may be of an identity document.

The one or more fields may be a plurality of fields. The method may further comprise using the at least one hardware processor to perform the recognition process for all of the plurality of fields in parallel. The method may further comprise using the at least one hardware processor to determine to stop an overall recognition process for the plurality of fields once the recognition process for all of the plurality of fields have been stopped. The method may further comprise using the at least one hardware processor to, in response to determining to stop the overall recognition process, automatically end the video stream.

The current text-recognition result may be combined with the preceding text-recognition result using Recognizer Output Voting Error Reduction (ROVER).

The method may further comprise using the at least one hardware processor to train the predictive model, prior to the recognition process for each of the one or more fields, using a training dataset comprising a plurality of labeled feature sets. Each of the plurality of labeled feature sets may comprise a feature tuple of the predefined size and a label indicating one of the plurality of classes. The method may further comprise using the at least one hardware processor to generate the training dataset by, for each of a plurality of video clips: perform another recognition process on one or more fields in the video clip, calculate the errors between combined text-recognition results obtained by the other recognition process for successive frames in the video clip, and record a stopping moment of the other recognition process, wherein the stopping moment is a frame in the video clip at which the other recognition process was stopped; and generate the plurality of labeled feature sets based on the calculated errors and the recorded stopping moment. Generating the plurality of labeled feature sets may comprise generating a feature tuple of the predefined size consisting of calculated errors for successive frames preceding and including the stopping moment, and labeling the feature tuple with the second class. Generating the plurality of labeled feature sets may comprise generating one or more feature tuples of the predefined size consisting of calculated errors for successive frames excluding the stopping moment, and labeling each of the one or more feature tuples with the first class.

The method may be embodied in executable software modules of a processor-based system, such as a mobile device or server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for predicting the stopping moment for text recognition in a video stream, using a predictive model, such as a neural network or other classifier. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Figure 1:
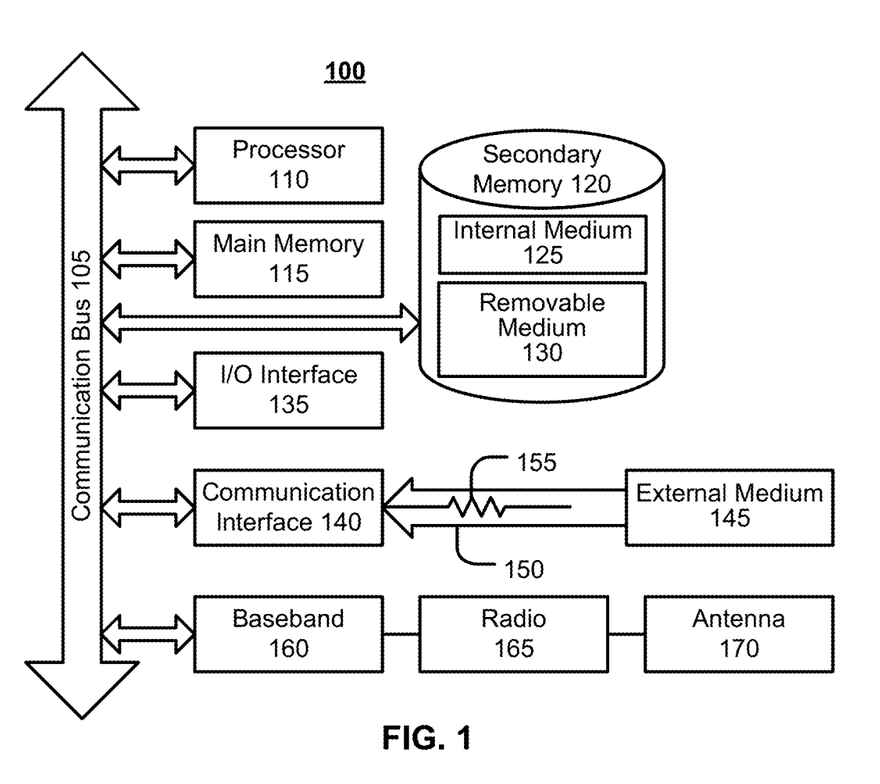
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods (e.g., to store and/or execute one or more software modules) described herein. System 100 can be a server or any conventional personal computer, or any other processor-enabled device that is capable of wired or wireless data communication. Other computer systems and/or architectures may be also used, as will be clear to those skilled in the art.

System 100 preferably includes one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 is a non-transitory computer-readable medium having computer-executable code (e.g., any of the software disclosed herein) and/or other data stored thereon. The computer software or data stored on secondary memory 120 is read into main memory 115 for execution by processor 110. Secondary memory 120 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 include an external hard disk drive, an external optical drive, an external magneto-optical drive, and/or the like.

As mentioned above, system 100 may include a communication interface 140. Communication interface 140 allows software and data to be transferred between system 100 and external devices (e.g. printers), networks, or other information sources. For example, computer software or data may be transferred to system 100, over one or more networks (e.g., including the Internet), from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125 and/or removable medium 130), external storage medium 145, and any peripheral device communicatively coupled with communication interface 140 (including a network information server or other network device). These non-transitory computer-readable media are means for providing software and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network (e.g., in the case of a mobile device, such as a smart phone). The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor(s) 110. Processor(s) 110 may have access to data storage areas 115 and 120. Processor(s) 110 are preferably configured to execute instructions (i.e., computer programs, such as the disclosed software) that can be stored in main memory 115 or secondary memory 120. Computer programs can also be received from baseband processor 160 and stored in main memory 110 or in secondary memory 120, or executed upon receipt. Such computer programs, when executed, can enable system 100 to perform the various functions of the disclosed embodiments.

2. Process Overview

Embodiments of processes for predicting the stopping moment for text recognition in a video stream, using a predictive model, such as a neural network or other classifier, will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processor(s) 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, may be illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

Ref22 introduces a stopping method for text recognition in a video stream. In the stopping method of Ref22, a frame enters the system, the document type is determined, zones are segmented, and fields are found. Text recognition is performed on each field, and the recognition result of the current frame is combined with the previous recognition results from prior frames, using Recognizer Output Voting Error Reduction (ROVER), which is described in Ref15 and Ref25. The combination of recognition results decreases the error as the number of captured frames increases. After combination, the expected distance between the current combined recognition result and the unknown recognition result after the next frame is estimated. If the estimated error is below a specified threshold for a field, representing satisfaction of the stopping criterion, the recognition process on that field is stopped. Otherwise, the recognition process on that field continues with the next frame.

A formal mathematical statement of this stopping problem can be formed. Text recognition in a video stream may be considered as a sequential decision problem. Let $\mathbb{X}$ represent a set of all possible recognition results for a text string. Given a sequence of image frames $I_1, I_2, I_3, \ldots$, obtained one at a time, the task is to recognize a text string with the correct value $x^* \in \mathbb{X}$. At stage n, text recognition is performed on the image frame $I_n$, to obtain the recognition result $x_n \in \mathbb{X}$. The per-frame recognition results $x_1$, $x_2, \ldots, x_n$ are combined to produce an accumulated recognition result $R_n \in \mathbb{X}$. The stopping decision is to either stop the recognition process and use R n as the final recognition result, or to continue the recognition process with at least one additional stage n+1 in an effort to obtain a recognition result with higher expected accuracy. If the recognition process is stopped at stage n, the loss function L n is a combination of the error and elapsed time:

$$L_n = \rho(R_n, x^*) + c \cdot n$$

wherein $\rho$ is a metric function on the set $\mathbb{X}$ that represents the error between the accumulated recognition result $R_n$ and the correct value $x^*$, and c is a constant value that represents the price paid for each observation (i.e., each frame that is processed).

The stopping rule can be formally expressed as a random variable N, representing the stopping time, with a distribution defined by a stopping method given the observations $x_1$, $x_2, x_3, \ldots$. The stopping problem is to minimize the expected loss:

$$E(L_n(X_1, X_2, \ldots, X_N)) \to \min_N$$

wherein $E(\bullet)$ is a mathematical expectation of loss, and $X_1$, $X_2, \ldots, X_k$ are random recognition results with identical joint distribution with $X^*$, of which $x_1, x_2, \ldots, x_k$ are realizations observed at stages $1, 2, \ldots, k$, respectively.

The stopping method proposed in Ref22 relies on an assumption that, starting from stage n, the expected distances between consecutive combined recognition results decrease over time, and thus, the text recognition problem can be considered monotone. The stopping method is then defined as thresholding the estimation of an expected distance between the current combined recognition result and the next recognition result:
Stop if $\hat{\Delta}_n \leq c$, where $$\hat{\Delta}_n \stackrel{\text{def}}{=} \frac{1}{n+1}\left(\delta + \sum_{i=1}^{n} \rho(R_n, R(x_1, x_2, \ldots, x_n, x_i))\right)$$

wherein $\delta$ is an external parameter, and wherein $R(x_1, x_2, \ldots, x_n, x_i)$ is a modeled combined recognition result of all consecutive observations, obtained by stage n, concatenated with the i-th observation.

2.2. Training of Predictive Model

In order to build a stopping rule based on machine learning, the stopping problem can be reformulated as a classification problem. Let a dataset $C = (\rho_0, y_0)$, $(\rho_1, y_1), \ldots, (\rho_k, y_k)$, such that $\rho_i \in \mathbb{R}^{m-1}$ and $y_i \in \{0, 1\}$, wherein $\rho_i$ represents a vector of m−1 Levenshtein distances between m sequential frames, k represents a size of the dataset C, and y represents a class label. In an embodiment, the value of y may be either 0, representing a classification to continue the recognition process, or 1, representing a classification to stop the recognition process. The dataset C may be divided into two datasets:

$$C = C^{train} \cup C^{test}$$

wherein $C^{train}$ is a training dataset, and $C^{test}$ is a testing dataset.

The set of classifiers may be denoted as $P^*$, such that P: $\mathbb{R}^{m-1} \to \{0, 1\}$, $\forall P \in P^*$. The estimation function of these classifiers on a sample $C^l$ may be expressed as:

$$Q(P, C^l) = \frac{1}{|C^l|} \cdot \sum_{(\rho, y) \in C^l} [P(\rho) = y]$$

The task is to train the classifier $P \in P^*$, so as to maximize the quality function on the training dataset, $$P = \arg\max_{P \in P^*} Q(P, C^{train})$$

while, at the same time, maximizing the quality function on the testing dataset:

$$P = \arg\max_{P \in P^*} Q(P, C^{train}) : Q(P, C^{test}) \to \max$$

To generate dataset C for training a classification-based stopping method, the method in Ref22, which is based on modeling the next combined result, may be used as a reference. In an embodiment, the classifier is trained to approximate the behavior of the method of Ref22, while reducing or eliminating its reliance on the assumption that the problem is monotone.

Figure 2:
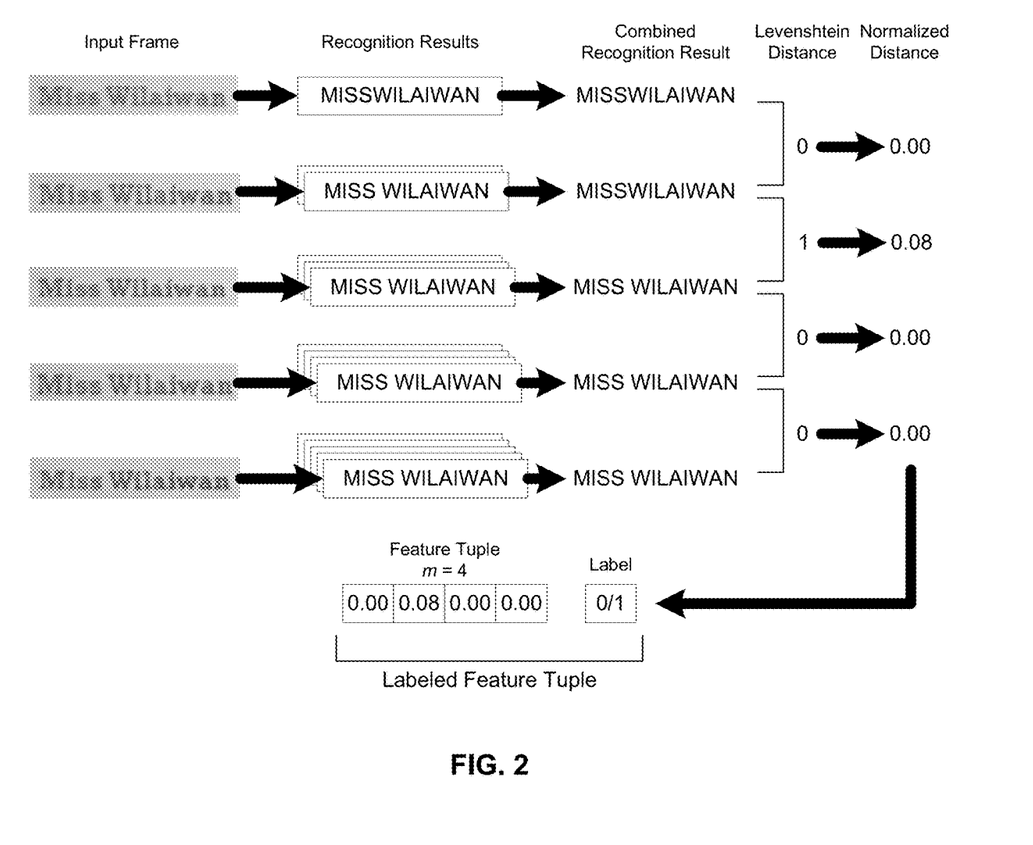
FIG. 2 illustrates how labeled features vectors may be generated for a dataset to be used to train a neural network, according to an embodiment.

FIG. 2 illustrates how feature tuples may be generated for dataset C, according to an embodiment. While FIG. 2 illustrates the process for generating labeled feature tuples for training the predictive model, the same process may be used to generate input feature tuples during operation of the predictive model. However, it should be understood that the input feature tuples, used during operation of the predictive model, will not be labeled (i.e., with the ground-truth class). Instead, the predictive model will be applied to the input feature tuples to predict the class for that input feature tuple.

For each frame of a video stream, an error metric may be calculated between the combined recognition result for that frame and the combined recognition result after the immediately preceding frame. In an embodiment, the normalized Levenshtein distance is used as the error metric. In an alternative embodiment, a different error metric may be used to calculate the distance or difference between recognition results.

This normalized Levenshtein distance may be calculated as:

$$\rho(R_n, R_{n-1}) = \frac{2 \cdot Lev(R_n, R_{n-1})}{|R_n| + |R_{n-1}| + Lev(R_n, R_{n-1})}$$

wherein $|R_n|$ is the length of the string $R_n$ (i.e., the combined recognition result at stage n), $|R_{n-1}|$ is the length of the string $R_{n-1}$ (i.e., the combined recognition result at stage n−1), and $Lev(R_n, R_{n-1})$ is the Levenshtein distance between strings $R_n$ and $R_{n-1}$. In this embodiment, the normalized Levenshtein distance is a value between 0 and 1. The triangle inequality holds for the normalized Levenshtein distance (Ref24).

The calculated errors (e.g., normalized Levenshtein distances) for a set of frames may be packaged into a feature tuple that is labeled with a ground-truth value, representing one of a plurality of classes of stopping decisions into which the feature tuple should be classified. To quickly generate a dataset C, the feature tuples and the ground-truth values to be used as the labels in labeled feature tuples may be derived by executing the stopping method of Ref22 with a fixed stopping threshold. Sets of m calculated errors for consecutive frames may be collected from the execution as the feature tuples. Each feature tuple may be labeled with the stopping decision that was made after processing the last frame represented in the feature tuple during execution. In an embodiment, the ground-truth value may be a binary class (i.e., two possible values) that identifies the stopping decision. A first value (e.g., 0) indicates that the recognition process for a given field should continue after processing the current frame (i.e., continue to stage n+1). In contrast, the second value (e.g., 1) indicates that the recognition process for the given field should stop after processing the current frame (i.e., stop at current stage n). Thus, each feature tuple belongs to one of these two classes, such that the stopping problem may be considered as a binary classification problem.

The value m represents a time window, in terms of a number of frames, that defines the length of each feature tuple. For example, m represents the length of the sequence of error measurements (e.g., normalized Levenshtein distances) between neighboring combined recognition results. In the illustrated embodiment, m=4. Thus, each video clip that is used to build the dataset C may be divided into sequences of normalized Levenshtein distances of length 4, and labeled with the ground-truth stopping decision that was made after the fourth frame, represented in the sequence, was processed. The dataset C may then be divided into two disjoint datasets, $C^{train}$ and $C^{test}$, for training and testing, respectively. Oversampling may be used to correct for imbalance in the distribution of classes in the datasets.

Since an objective of the stopping method is to make "online" stopping decisions (i.e., to make a decision at any iteration of the recognition process based only on the previously obtained observations), a regression model would be inappropriate. This is because a regression model makes its decision after the fact. Thus, in an embodiment, the predictive model comprises a fully connected neural network. The neural network may be a multilayer perceptron (MLP), such as the MLPClassifier class in the Scikit-learn library, which implements an MLP algorithm that trains using back-propagation. In an embodiment, the neural network was trained to predict a pseudo-probability of stopping on a current frame, with three hidden layers of 16, 32, and 16 nodes, respectively, Rectified Linear Units (ReLU) as the activation function, an adaptive learning rate with an initial value of 0.01, a batch size of 200, a maximum number of iterations of 200, and the Adam optimization solver. The predictive model may be trained using the dataset C, which may be implemented as a first array of a samples×b features, with the features consisting of normalized Levenshtein distances between combined recognition results for neighboring frames, represented as floating-point feature tuples, and a second array of a labels, with each label representing the target value (i.e., ground-truth class, representing the ground-truth stopping decision) for the corresponding feature tuple at the same index in the first array.

In an embodiment, cross-entropy is used as the loss function:

$$L_{log}(y,p) = -(y \log(p) + (1-y)\log(1-p))$$

wherein p is a probability estimation. This probability estimation may be obtained by executing the predict_proba( ) function of the Scikit-learn library.

2.3. Stopping Method Using Trained Predictive Model

Figure 3:
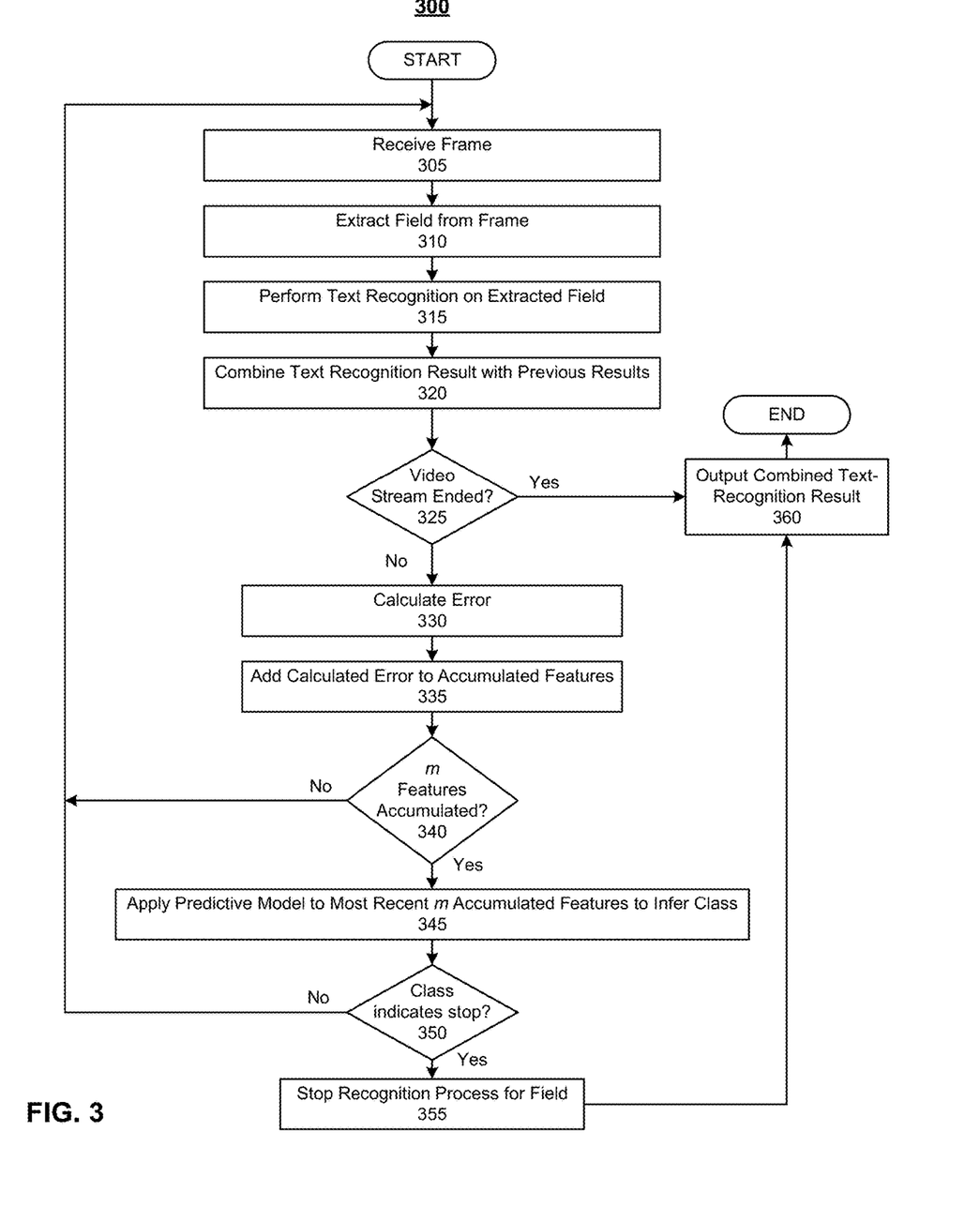
FIG. 3 illustrates a stopping method in a recognition process, according to an embodiment.

FIG. 3 illustrates a stopping method in a recognition process 300 for a text field, according to an embodiment. Process 300 may be implemented by one or more processor(s) 110 in a system 100, such as a mobile device (e.g., smartphone), document-scanning device, server, or the like. Recognition process 300 may utilize a predictive model, such as a neural network or other classifier that has been previously trained using the dataset C, described above. Instead of modeling the error on the next frame, accumulated errors between recognition results for successive frames may be fed as feature tuples to this neural network, which classifies the feature tuples into one of two binary classifications, in order to decide whether or not to stop the recognition process at the current frame.

In subprocess 305, a new frame is received. The new frame may be the next frame in a sequence of image frames of a video stream, such as a real-time video stream of an identity document being captured by a system 100. This new frame represents the current frame being processed by the current iteration of process 300.

In subprocess 310, a text field is extracted from the current frame. This field extraction may be performed in any known manner, including by detecting objects (Ref11), and segmenting the detected object into text fields (Ref12). The output of subprocess 310 may be a sub-image from the frame that comprises just the extracted text field (e.g., with one or more pixels of margin). Examples of such a sub-image are illustrated as the input frames in FIG. 2.

In subprocess 315, text recognition is performed on the extracted field (e.g., in the sub-image). Text recognition may be performed in any known manner, such as the manner described in Ref13. The output of subprocess 315 may be a text string representing the current result of the text recognition on the extracted field. Examples of such a text string are illustrated as the recognition results in FIG. 2.

In subprocess 320, the result of the text recognition on the extracted field, output by subprocess 315, from the current frame, received in subprocess 305, is combined with any previous results to produce a combined text recognition result. The combination of the current and preceding text-recognition results may be performed in any known manner. In an embodiment, ROVER integration is used to combine the text-recognition results in subprocess 320. Examples of combined recognition results are illustrated in FIG. 2.

In subprocess 325, it may be determined whether or not the video stream has ended. In other words, it is determined whether or not the current frame is the final frame from the video stream. If the video stream has ended (i.e., "Yes" in subprocess 325), the combined text-recognition result, output by subprocess 320, may be output in subprocess 360 as the final text-recognition result for the particular field extracted in subprocess 310. In this case, the stopping decision is moot, since there are no more frames to be processed. On the other hand, if the video stream has not ended (i.e., "No" in subprocess 325), process 300 continues to subprocess 330.

In subprocess 330, the error between the current combined text-recognition result and the preceding combined text-recognition result may be calculated. For example, the error may be calculated as a normalized Levenshtein distance between the current combined text-recognition result for the field and the immediately preceding combined text-recognition result for the field, as discussed elsewhere herein. In an alternative embodiment, a different error metric may be calculated in subprocess 330.

In subprocess 335, the calculated error is added to a set of features that are being accumulated. In particular, prior to application of the predictive model, a set of m features may be accumulated in a feature tuple. It should be understood that the feature tuple will comprise the errors that have been calculated in m consecutive iterations of subprocess 330 for m consecutive frames in the video stream. For example, referring to FIG. 2, the errors, calculated in m=4 consecutive iterations of subprocess 330, may comprise normalized Levenshtein distances of 0.00, 0.00, and 0.00. These normalized Levenshtein distances may be accumulated in a feature tuple of size m=4: [0.00, 0.08, 0.00, 0.00].

In subprocess 340, it may be determined whether or not m features have been accumulated (e.g., whether or not the feature tuple of accumulated features has reached a size of m). If m features have not yet been accumulated (i.e., "No" in subprocess 340), process 300 returns to subprocess 305 to process the next frame from the video stream. Otherwise, if m features have been accumulated (i.e., "Yes" in subprocess 340), process 300 proceeds to subprocess 345.

It should be understood that m may represent a sliding window that slides across accumulated features to collect tuples of the most recent set of m features. In this case, once m+1 frames have been processed, subprocess 340 will always resolve to "Yes." For example, using the accumulated features depicted in FIG. 2 as an example, if m=3, an initial feature tuple would be [0.00, 0.08, 0.00], the next feature tuple would be [0.08, 0.00, 0.00], and so on and so forth. More generally, a sliding window of size m slides across the accumulated features as each new frame is processed, to accumulate the most recently accumulated m features.

In subprocess 345, the predictive model is applied to the most recently accumulated m features to infer the stopping decision via binary classification. For example, the accumulated feature tuple may be input into the trained neural network, described elsewhere herein. The trained neural network may output a binary classification, with a first value indicating that the recognition process for the field should continue and a second value indicating that the recognition process for the field should stop.

In subprocess 350, it may be determined whether the classification, output by the predictive model (e.g., neural network) in subprocess 345, indicates that the recognition process should continue or stop. For example, if the classification is the first value (e.g., 0), subprocess 350 will determine to continue to the recognition process, whereas, if the classification is the second value (e.g., 1), subprocess 350 will determine to stop the recognition process. If the classification indicates that the recognition process should continue (i.e., "No" in subprocess 350), process 300 returns to subprocess 305 to process the next frame from the video stream. Otherwise, if the classification indicates that the recognition process should stop (i.e., "Yes" in subprocess 350), process 300 stops the recognition process for the field in subprocess 355. In subprocess 360, the current combined text-recognition result is output as the final text-recognition result for the field.

Process 300 may be performed for each field to be recognized in the video stream. For example, for a video stream of an identity document, process 300 may be performed for each field to be recognized in the identity document. In the case of a passport, these fields may comprise the name of the passport holder, the passport number from the passport-number field, the passport number in the machine-readable zone, optional data in the machine-readable zone, the issuing nation, the date of birth of the passport holder, the date of issuance, the date of expiration, and/or the like. Similarly, in the case of a driver's license, these fields may comprise the name of the driver, the license number, the issuing state, the date of birth of the driver, the date of issuance, the date of expiration, and/or the like.

When there are a plurality of fields to be recognized in the video stream, process 300 may be executed for each field in parallel (e.g., as parallel threads) or serially, for each frame in the video stream. For real-time recognition, the process 300 for each field should be executed in parallel, if possible, to reduce processing latencies. In either case, a decision to stop the overall recognition process for the entire document may be made as soon as the decision to stop has been made for all of the plurality of fields. For example, as long as the process 300 for at least one field has not ended, the overall recognition process may continue. However, as soon as the process 300 for every field has ended, the overall recognition process may end. In an embodiment, as soon as the decision to stop the overall recognition process has been made, the system 100 may automatically terminate or otherwise end capture of the video stream, and pass the final combined text-recognition result for each of the plurality of fields (i.e., output in subprocess 360 of the process 300 for each field) to one or more downstream functions of the same system 100 or a different system. These downstream function(s) may comprise identity verification, authentication, application or registration processing, and/or the like.

While process 300 is described as executing iteratively on successive frames in a video stream, it should be understood that this does not require the processing of every frame that is captured. Rather, frames could be sampled from the captured frames, according to a fixed sampling rate, and process 300 could be executed only on the sampled frames. This may be necessary in a system 100 that does not have the computing resources to process every single frame in a video stream in real time.

3. Experimental Results

In order to evaluate process 300, the openly accessible benchmarks of the Mobile Identity Document Video (MIDV) family were used, with an evaluation protocol that closely follows the protocol in Ref27. The first dataset in the MIDV family is MIDV-500 (Ref28), which utilizes samples of identity documents that are not copyrighted and which are distributed with an open license. The MIDV-500 dataset includes 50 types of documents, consisting of 17 types of identity cards, 14 types of passports, 13 types of driver's licenses, and 6 other types of identity documents. To create the MIDV-500 dataset, each document was printed, and 10 videos of each printed document were filmed under five different conditions. Each of the 500 resulting video clips are at least three seconds in duration. A total of 15,000 images were captured, with each image having a resolution of 1080×1920 pixels. In total, the MIDV-500 dataset contains 546 text fields in different languages.

The MIDV-2019 dataset was released about one year after the MIDV-500 dataset, and contains 200 more video clips from the same 50 documents. However, the video clips in the MIDV-2019 dataset were filmed under two new conditions: high projective distortion; and low lighting. The video clips in the MIDV-2019 dataset have a resolution of 2160× 3840 pixels.

The MIDV-2020 dataset was recently released (Ref30), and consists of 1,000 artificially generated identity documents. Each identity document has unique text fields and an artificially generated photograph of a non-existent person. In total, the MIDV-2020 dataset contains 1,000 video clips, 2,000 scans, and 1,000 photographs of documents, with rich annotations. With a total of 72,409 tagged images, mostly in the form of video frames, the MIDV-2020 dataset is possibly the largest open dataset of identity documents.

For experimentation, the MIDV-500 and MIDV-2019 datasets were used to train the neural network of the predictive model, whereas the MIDV-2020 dataset was used for testing. Overlapping documents were excluded from the datasets to ensure the independence of the training and testing samples, even on the level of document types. The fields of all three datasets were recognized using the two-step text-recognition framework for identity documents described in Ref13.

To evaluate the generalization abilities of the trained neural network, an experiment was conducted on the independent RoadText-1K dataset (Ref31). The RoadText-1K dataset contains 1,000 video clips captured from moving vehicles, with feature annotations for text objects within the road scenes. In other words, this is a completely different type of data than the text fields in the MIDV family of datasets.

For the experiment, only video clips that tracked text objects for at least 30 frames and had ground-truth values consisting of digits and/or letters of the Latin alphabet were used. In all cases, only the first 30 frames of each video clip were used. The text objects were detected using the pre-trained model described in Ref32 with thin-plate spline transformation, residual neural network (ResNet) feature extraction, bidirectional long short-term memory (BiLS™) sequence modeling, and attention-based sequence prediction.

After data preparation, three datasets were obtained. The training dataset, derived from the MIDV-500 and MIDV-2019 datasets, contained 16,000 elements of each classification. The first testing dataset, derived from the MIDV-2020 dataset, contained 40,000 elements of the first class (i.e., continue the recognition process) and 80,000 elements of the second class (i.e., stop the recognition process). The second testing dataset, derived from the RoadText-1K dataset, contained 22,800 elements of the first class (i.e., continue the recognition process) and 22,100 elements of the second class (i.e., stop the recognition process). The neural network was trained for 40 epochs and exhibited an area under the curve (AUC) of the receiver operating characteristic (ROC) curve of 0.71.

The process of recognizing text fields in a video stream, wherein each frame is independently processed and the per-frame results are accumulated, can be considered an anytime algorithm (Ref33). Thus, the gradual increase of the recognition accuracy can be analyzed with performance profiles. The expected performance profiles for processes, in which stopping rules are applied, could be used to compare the stopping methods of the processes. Such profiles visualize the achieved trade-off between the mean number of processed frames and the mean accuracy of the text-recognition results at the time that the recognition process is stopped.

Figure 4A:
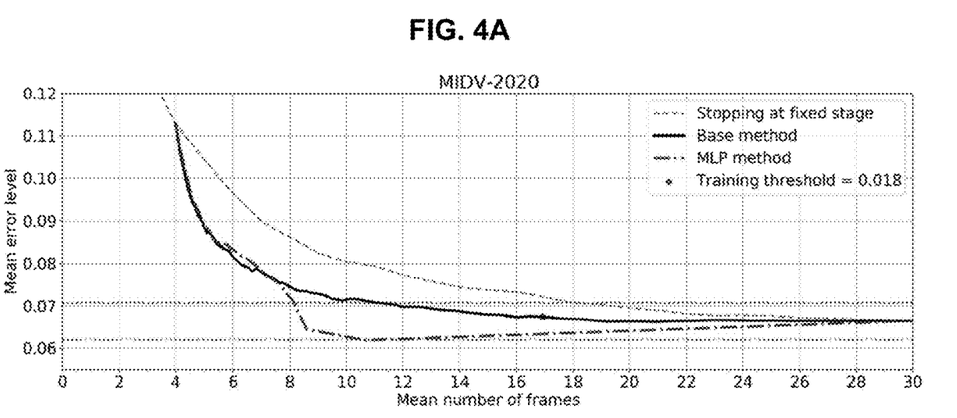
FIGS. 4A and 4B illustrate expected performance profiles for three stopping methods, according to an experiment.
Figure 4B:
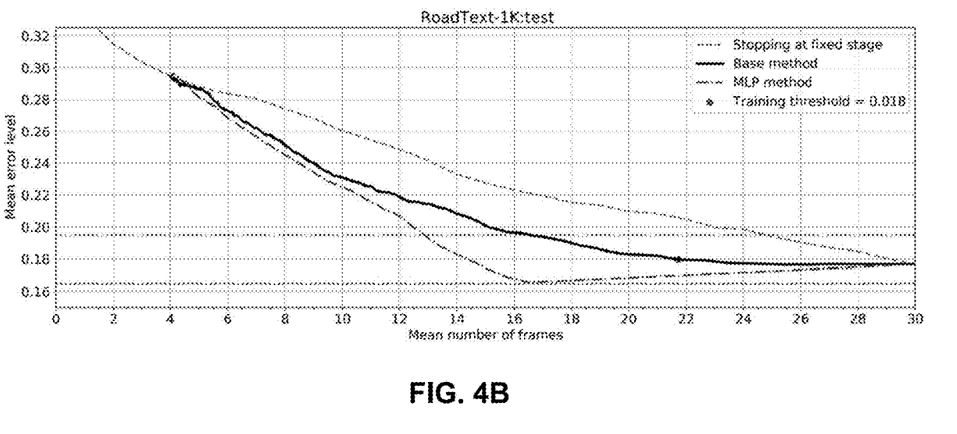

The profiles of the existing algorithm in Ref27 were built by varying the stopping threshold, against which the magnitude of the error was compared to make the stopping decision. The profiles of an algorithm using the disclosed process 300 were built by varying the probability of assigning text objects to classes. FIG. 4A illustrates the expected performance profiles for three methods when tested on the first testing dataset, derived from the MIDV-2020 dataset, and FIG. 4B illustrates the expected performance profiles for the same three methods when tested on the second testing dataset, derived from the RoadText-1K dataset, according to the experiment. The three methods were a stopping method that stops at a fixed stage (i.e., "Stopping at fixed stage"), a stopping method that implements the algorithm in Ref27 (i.e., "Base method"), and a stopping method that implements disclosed process 300 (i.e., "MLP method"). Each expected performance profile represents the mean distance from the final combined text-recognition result to the correct value (Y-axis), against the mean number of processed frames before stopping (X-axis).

As illustrated in FIGS. 4A and 4B, on average, the performance profile of the stopping method in disclosed process 300 falls below the other stopping methods for both testing datasets. This indicates that disclosed process 300 has greater efficiency. In other words, for the same mean number of processed frames, disclosed process 300 achieves a lower mean recognition error at stopping time than the other methods. The summarized values of the mean error levels are presented in the tables below:

Mean Error Rate with a Limit to Mean Number of Processed Frames (MIDV-2020 Dataset)

| Method | Limit of the mean number of processed frames n | | | | |
|---|---|---|---|---|---|
| | n ≤ 4 | n ≤ 6 | n ≤ 8 | n ≤ 10 | n ≤ 12 |
| Base (Ref27) | 0.110 | 0.081 | 0.074 | 0.071 | 0.070 |
| Disclosed | 0.110 | 0.081 | 0.069 | 0.062 | 0.062 |

Mean Error Rate with a Limit to Mean Number of Processed Frames (RoadText-1L Dataset)

| Method | Limit of the mean number of processed frames n | | | | |
|---|---|---|---|---|---|
| | n ≤ 4 | n ≤ 8 | n ≤ 12 | n ≤ 15 | n ≤ 17 |
| Base (Ref27) | 0.295 | 0.250 | 0.220 | 0.201 | 0.195 |
| Disclosed | 0.295 | 0.245 | 0.205 | 0.177 | 0.165 |

As depicted in these tables, for every limit on the mean number of processed frames, the error rate of the disclosed method, utilizing process 300, is less than or equal to the base method described in Ref27. There is a maximum error reduction of 12.7% when the compared methods are configured to stop with the mean number of processed frames not exceeding 10, and 15.4% when the compared methods are configured to stop with the mean number of processed frames not exceeding 17, even without retraining the neural network on the RoadText-1L dataset. Thus, the disclosed method represents a significant improvement over the base method.

4. REFERENCES

References are made herein to the following documents, which are all hereby incorporated herein by reference in their entireties:

Ref1: Dangiwa et al., "A business card reader application for iOS devices based on Tesseract," in 2018 Int'l Conference on Signal Processing and Information Security (ICSPIS), 2018, pp. 1-4, doi:10.1109/CSPIS.2018.8642727;

Ref2: Islam et al., "A survey on optical character recognition system," arXiv preprint:1710.05703, 2017;

Ref3: Gai et al., "A survey on fintech," Journal of Network and Computer Applications, vol. 103, pp. 262-273, 2018, doi:10.1016/j.jnca.2017.10.011;

Ref4: Ravneet, "Text recognition applications for mobile devices," Journal of Global Research in Computer Science, vol. 9, no. 4, pp. 20-24, 2018;

Ref5: Bulatov et al., "Smart IDReader: Document recognition in video stream," in 14th Int'l Conference on Document Analysis and Recognition (ICDAR), vol. 6, IEEE, 2017, pp. 39-44, doi:10.1109/ICDAR.2017.347;

Ref6: Ngoc et al., "Document detection in videos captured by smartphones using a saliency-based method," in Int'l Conference on Document Analysis and Recognition Workshops (ICDARW), 2019, pp. 19-24, doi:10.1109/ICDARW.2019.30059;

Ref7: Chernov et al., "Image quality assessment for video stream recognition systems," in 10th Int'l Conference on Machine Vision (ICMV 2017), Verikas et al., vol. 10696, Int'l Society for Optics and Photonics (SPIE), 2018, doi:10.1117/12.2309628;

Ref8: 2006 Russian Federal Law No. 152, on personal data, www.consultant.ru/documents/cons doc LAW 61801;

Ref9: Regulation (EU) 2016/679 of the European Parliament and of the Council of 27 Apr. 2016 on the protection of natural persons with regard to processing of personal data and on the free movement of such data, and repealing directive 85/46/EC (General Data Protection Regulation)," Official JEur Union 2016, no. L119, pp. 1-88, 2016;

Ref10: 2002 Public Register of Authentic Identity and Travel Documents Online, www.consilium.europa.eu/prado/en/prado-start-page.html;

Ref11: Tropin et al., "Approach for document detection by contours and contrasts," in 2020 25 Int'l Conference on Pattern Recognition (ICPR), 2021, pp. 9689-9695, doi:10.1109/ICPR48806.2021.9413271;

Ref12: Chernyshova et al., "Localization of characters horizontal bounds in text line images with fully convolutional network," in Proceedings SPIE, 12th Int'l Conference on Machine Vision (ICMV 2019), 2020, pp. 1-8, doi:10.1117/12.2559449;

Ref13: Chernyshova et al., "Two-step CNN framework for text line recognition in camera-captured images," in IEEE Access, vol. 8, 2020, pp. 32587-32600, doi:10.1109/ACCESS.2020.2974051;

Ref14: Ryan et al., "An examination of character recognition on ID card using template matching approach," Procedia Computer Science, vol. 59, pp. 520-529, 2015, doi:10.1016/j.procs.2015.07.534;

Ref15: Bulatov, "A method to reduce errors of string recognition based on combination of several recognition results with per-character alternatives," Bulletin of the South Ural State University, Series: Mathematical Modelling, Programming and Computer Software, vol. 12, no. 3, pp. 74-88, 2019, doi:10.14529/mmp190307;

Ref16: Bulatov, "Selecting optimal strategy for combining per-frame character recognition results in video stream," ITiVS, no. 3, pp. 45-55, 2017;

Ref17: Chow et al., "Great expectations: The theory of optimal stopping," Houghton Mifflin, 2971;

Ref18: Berezovsky et al., "Problems of Best Selection," Moscow: Academia Nauk USSR, 1984;

Ref19: Ferguson, "Mathematical statistics: a decision theoretic approach," Academic press, p. 396, 1967;

Ref20: Ferguson et al., "Stopping rules for proofreading," Journal of Applied Probability, vol. 26, no. 2, pp. 304-313, 1989, doi:10.2307/3214037;

Ref21: Liu et al., "Editorial for special issue on advanced topics in document analysis and recognition," Int'l Journal on Document Analysis and Recognition (IJDAR), vol. 22, p. 89-191, 2019, doi:10.1007/s10032-019-00342-z;

Ref22: Bulatov et al., "On optimal stopping strategies for text recognition in a video stream as an application of a monotone sequential decision model," IJDAR, vol. 22, no. 3, pp. 303-314, 2019, doi:10.1007/s10032-019-00333-0;

Ref23: Arlazarov et al., "Method of determining the necessary number of observations for video stream documents recognition," in Proc. SPIE (ICMV 2017), vol. 10696, 2018, doi:10.1117/12.2310132;

Ref24: Yujian et al., "A normalized Levenshtein distance metric," IEEE Transactions on Pattern Analysis and Machine Intelligence, vol. 29, no. 6, pp. 1091-1095, 2007, doi:10.1109/TPAMI.2007.1078;

Ref25: Fiscus, "A post-processing system to yield reduced word error rates: Recognizer Output Voting Error Reduction (ROVER)," in IEEE Workshop on Automatic Speech Recognition and Understanding, 1997, pp. 347-354, doi:10.1109/ASRU.1997.659110;

Ref26: Pedregosa et al., "Scikit-learn: Machine learning in Python," Journal of Machine Learning Research, vol. 12, pp. 2825-2830, 2011;

Ref27: Bulatov et al., "Fast approximate modelling of the next combination result for stopping the text recognition in a video," in 2020 25th Int'l Conference on Pattern Recognition (ICPR), 2021, pp. 239-246, doi:10.1109/ICPR48806.2021.9412574;

Ref28: Arlazarov et al., "MIDV-500: A dataset for identity document analysis and recognition on mobile devices in video stream," Computer Optics, vol. 43, no. pp. 818-824, 2019, doi:10.18287/2412-6179-2019-43-5-818-824;

Ref29: Bulatov et al., "MIDV-2019: Challenges of the modern mobile-based document OCR," in ICMV 2019, Osten et al. ed., vol. 11433, no. 114332N, SPIE, January 2020, pp. 1-6, doi:10.1117/12.2558438;

Ref30: Bulatov et al., "MIDV-2020: A comprehensive benchmark dataset for identity document analysis," Computer Optics, vol. 46, no. 2, pp. 252-270, 2022, doi:10.18287/2412-6179-00-1006;

Ref31: Reddy et al., "Roadtext-1k: Text detection & recognition dataset for driving videos," 2020 IEEE Int'l Conference on Robotics and Automation (ICRA), pp. 11074-11080, 2020;

Ref32: Baek et al., "What is wrong with scene text recognition model comparisons? Dataset and model analysis," in 2019 IEEE/CVF Int'l Conference on Computer Vision (ICCV), 2019, pp. 4714-4722, doi:10.1109/ICCV.2019.00481; and Ref33: Zilberstein, "Using anytime algorithms in intelligent systems," AI Magazine, vol. 17, no. 3, p. 73, 1996.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to, for each of one or more fields in a plurality of frames from a video stream for which a recognition process is being performed:
    perform text recognition on the field to produce a current text-recognition result;
    combine the current text-recognition result with a preceding text-recognition result for the field from one or more prior frames;
    calculate an error between the combined text-recognition result and the preceding text-recognition result;
    add the calculated error to an accumulated feature set; and,
    when the accumulated feature set has reached a predefined size, wherein the predefined size is greater than one,
        apply a predictive model to the accumulated feature set of the predefined size to classify the accumulated feature set into one of a plurality of classes, wherein the plurality of classes comprises a first class that indicates continuation of the recognition process, and a second class that indicates stopping of the recognition process,
        when the one class is the first class, continue the recognition process for the field, and,
        when the one class is the second class, stop the recognition process for the field.

2. The method of claim 1, wherein the error is calculated based on a Levenshtein distance between the combined text-recognition result and the preceding text-recognition result.

3. The method of claim 2, wherein the error is a normalized Levenshtein distance.

4. The method of claim 1, wherein the plurality of classes consists of the first class and the second class.

5. The method of claim 1, wherein the predictive model comprises a neural network.

6. The method of claim 5, wherein the neural network comprises a multilayer perceptron.

7. The method of claim 1, wherein the accumulated feature set of the predefined size consists of a plurality of most recently accumulated features within a sliding window having the predefined size.

8. The method of claim 1, wherein the video stream is of an identity document.

9. The method of claim 1, wherein the one or more fields are a plurality of fields.

10. The method of claim 9, further comprising using the at least one hardware processor to perform the recognition process for all of the plurality of fields in parallel.

11. The method of claim 10, further comprising using the at least one hardware processor to determine to stop an overall recognition process for the plurality of fields once the recognition process for all of the plurality of fields have been stopped.

12. The method of claim 11, further comprising using the at least one hardware processor to, in response to determining to stop the overall recognition process, automatically end the video stream.

13. The method of claim 1, wherein the current text-recognition result is combined with the preceding text-recognition result using Recognizer Output Voting Error Reduction (ROVER).

14. The method of claim 1, further comprising using the at least one hardware processor to train the predictive model, prior to the recognition process for each of the one or more fields, using a training dataset comprising a plurality of labeled feature sets.

15. The method of claim 14, wherein each of the plurality of labeled feature sets comprises a feature tuple of the predefined size and a label indicating one of the plurality of classes.

16. The method of claim 15, further comprising using the at least one hardware processor to generate the training dataset by, for each of a plurality of video clips:
    perform another recognition process on one or more fields in the video clip, calculate the errors between combined text-recognition results obtained by the other recognition process for successive frames in the video clip, and record a stopping moment of the other recognition process, wherein the stopping moment is a frame in the video clip at which the other recognition process was stopped; and
    generate the plurality of labeled feature sets based on the calculated errors and the recorded stopping moment.

17. The method of claim 16, wherein generating the plurality of labeled feature sets comprises generating a feature tuple of the predefined size consisting of calculated errors for successive frames preceding and including the stopping moment, and labeling the feature tuple with the second class.

18. The method of claim 17, wherein generating the plurality of labeled feature sets comprises generating one or more feature tuples of the predefined size consisting of calculated errors for successive frames excluding the stopping moment, and labeling each of the one or more feature tuples with the first class.

19. A system comprising:
    at least one hardware processor; and
    one or more software modules that are configured to, when executed by the at least one hardware processor,
        perform text recognition on the field to produce a current text-recognition result,
        combine the current text-recognition result with a preceding text-recognition result for the field from one or more prior frames,
        calculate an error between the combined text-recognition result and the preceding text-recognition result,
        add the calculated error to an accumulated feature set, and, when the accumulated feature set has reached a predefined size, wherein the predefined size is greater than one,
    apply a predictive model to the accumulated feature set of the predefined size to classify the accumulated feature set into one of a plurality of classes, wherein the plurality of classes comprises a first class that indicates continuation of the recognition process, and a second class that indicates stopping of the recognition process,
    when the one class is the first class, continue the recognition process for the field, and,
    when the one class is the second class, stop the recognition process for the field.

20. A non-transitory computer-readable medium having instructions stored therein, wherein the instructions, when executed by a processor, cause the processor to:
    perform text recognition on the field to produce a current text-recognition result;
    combine the current text-recognition result with a preceding text-recognition result for the field from one or more prior frames;
    calculate an error between the combined text-recognition result and the preceding text-recognition result;
    add the calculated error to an accumulated feature set; and,
    when the accumulated feature set has reached a predefined size, wherein the predefined size is greater than one,
        apply a predictive model to the accumulated feature set of the predefined size to classify the accumulated feature set into one of a plurality of classes, wherein the plurality of classes comprises a first class that indicates continuation of the recognition process, and a second class that indicates stopping of the recognition process,
        when the one class is the first class, continue the recognition process for the field, and,
        when the one class is the second class, stop the recognition process for the field.

* * * * *